US011026859B1

(12) United States Patent
Rovekamp et al.

(10) Patent No.: US 11,026,859 B1
(45) Date of Patent: Jun. 8, 2021

(54) WEARABLE ROBOTIC UPPER BODY GARMENT

(71) Applicant: United States of America as represented by the Administrator of NASA, Washington, DC (US)

(72) Inventors: Roger Rovekamp, Kemah, TX (US); Christopher Beck, Houston, TX (US); Craig Cornwall, Boise, ID (US)

(73) Assignee: United States of America as represented by the Administrator of the National Aeronautics and Space Administration, Washington, DC (US)

( * ) Notice: Subject to any disclaimer, the term of this patent is extended or adjusted under 35 U.S.C. 154(b) by 423 days.

(21) Appl. No.: 15/956,986

(22) Filed: Apr. 19, 2018

Related U.S. Application Data (60) Provisional application No. 62/487,986, filed on Apr. 20, 2017.

(51) Int. Cl.
    *A61H 1/02*     (2006.01)
    *A41D 1/00*     (2018.01)
    *B25J 9/00*     (2006.01)

(52) U.S. Cl.
    CPC .......... *A61H 1/0281* (2013.01); *A41D 1/002* (2013.01); *B25J 9/0006* (2013.01); *A61H 2201/165* (2013.01); *A61H 2201/1614* (2013.01); *A61H 2201/1635* (2013.01); *A61H 2201/1671* (2013.01); *A61H 2205/062* (2013.01)

(58) Field of Classification Search
    CPC ........................... A61H 1/0274; A61H 1/0281
    See application file for complete search history.

(56) References Cited

U.S. PATENT DOCUMENTS

| | | | |
|---|---|---|---|
| 8,409,118 B2 | 4/2013 | Agrawal et al. | |
| 8,968,220 B2 | 3/2015 | Han et al. | |
| 10,596,059 B2* | 3/2020 | Angold | A45F 3/14 |
| 2003/0223844 A1* | 12/2003 | Schiele | A63B 21/00178 414/5 |
| 2006/0161220 A1* | 7/2006 | Kobayashi | A61H 1/0277 607/49 |
| 2007/0123097 A1 | 5/2007 | Herr et al. | |

(Continued)

*Primary Examiner* — LaToya M Louis
(74) *Attorney, Agent, or Firm* — David G. Matthews; Theodore U. Ro; Edward K. Fein (57) ABSTRACT

A system and method is provided for a wearable robotic upper body garment. In an embodiment, an upper body garment or apparatus comprises a shoulder saddle, one or more actuators, one or more flexible tendons, back torso section, front, torso section, torso wrap, and upper arm cuff. The shoulder saddle may be comprised of a yoke and one or more elevated shoulder sections. The one or more elevated should sections may be comprised of a first elevated shoulder section. In an embodiment, the back torso and front torso sections may be structurally connected to the yoke. In an embodiment, the one or more actuators may be structurally connected to either said back torso section or front torso section. In an embodiment, the one or more flexible tendons may be operationally connected to a predetermined one or more actuators and an upper arm cuff. In an embodiment and during operations, the one or more actuators effectuate a pulling motion on one or more flexible tendons enabling or augmenting movement about an upper extremity joint.

16 Claims, 7 Drawing Sheets

(56) References Cited

U.S. PATENT DOCUMENTS

| | | | |
|---|---|---|---|
| 2010/0063601 A1* | 3/2010 | Sankai | B25J 9/0006 623/25 |
| 2014/0277739 A1 | 9/2014 | Kornbluh et al. | |
| 2015/0173993 A1 | 6/2015 | Walsh et al. | |
| 2016/0206497 A1 | 7/2016 | Deshpande et al. | |

* cited by examiner

WEARABLE ROBOTIC UPPER BODY GARMENT

CROSS-REFERENCE TO RELATED APPLICATIONS

This application claims priority to and the benefit of U.S. Provisional Application Ser. No. 62/487,986 filed on Apr. 20, 2017, the entire contents of which are hereby incorporated by reference.

ORIGIN OF THE INVENTION

The invention described herein was made pursuant to research, development, or exploration work under a contract with the National Aeronautics and Space Administration. The invention may be manufactured and used by or for the Government of the United States of America for governmental purposes without the payment of any royalties thereon or therefor.

BACKGROUND

A wearable robotic upper body garment could benefit humans who, for example, suffer from physical disabilities or engage in activities that involve load carrying or manipulation.

Regarding physical disabilities, traumatic brain injury (TBI) is a condition that has left approximately 5.3 million Americans with a long-term disability. Strokes are also a common cause for upper limb movement disorders; over half a million Americans experience their first stroke every year. Task-specific and intensive practice could significantly improve motor recovery and induce neuroplasticity after brain injury. The greater effectiveness of intensive task-specific practice relative to standard therapy techniques suggests that repetitive motor practice is a crucial rehabilitation component and provides a key opportunity for the introduction of robotics in rehabilitation. Achieving voluntary isolated movements after neurological injuries such as TBI and strokes are common therapy goals. Synergistic movement patterns that occur after neurological injuries have the potential to interfere with activities of daily living (ADLs) and limit functional independence of the individual. A common rehabilitation approach to address unwanted synergies includes manual fixation of undesired movements and facilitation of desired movements.

Robotic appliances used in upper extremity rehabilitation can provide different types of movement and motion support such as active, passive, haptic, and others. Robotic applications are generally active in nature because these applications generally rely on one or more actuators thereby enhancing, augmenting, or producing movement of the upper extremity. The trend of applying robotics to address these rehabilitation challenges continues to grow. Upper extremity rehabilitation is comprised of actions and movements that have the potential to induce the individual to re-learn movements; upper extremity assistance is comprised of actions and movements that simulate a human user's independence and quality of life. Existing robotic devices that provide the capability to actuate the affected proximal upper extremities for rehabilitative or assistive purposes, however, are generally ground-based and not wearable and portable. Wearable robotic devices offer additional potential advantages, including allowing more task-oriented therapy (i.e. performing functional tasks as opposed to merely prescribed motions that are somewhat decoupled from practical ADLs), and bringing therapy to new venues including the home. Additional considerations include practical considerations such as relatively easy and fast set-up times and economic considerations such as a reasonable price.

Regarding activities that involve load carrying or manipulation, means for amplifying the ability for a user to manipulate increased load or loads for a greater amount of time may lessen the likelihood of injury, improve efficiency of operations, and achieve tasks that were previously unachievable due to human strength or endurance limitations.

A first type of robotic appliance is designed for rehabilitation, for assistance, or to amplify the ability for a user to manipulate increased load/loads for a greater amount of time and may comprise a mechanical structure that mirrors the skeletal structure of a limb including a limb's joint(s). Stated otherwise, the first type of robotic appliance may comprise a mechanical or artificial joint. In direct contrast, a second type of robotic appliance is generally known in the art as not including artificial, mechanical joints. Rather, this second type of robotic appliance is generally known in the art to contact a human user's limb in predetermined proximal and distal locations while utilizing the human user's joints for movement and motion.

The mechanical structure of prior art designs for upper extremity robotic devices is generally based on either static test articles or devices that may be considered fully rigid devices. Static test articles and fully rigid devices are not portable or practical for being worn by a human user. Stated otherwise, static test articles and fully rigid devices are incapable of applying loads to a human user in such a way to provide beneficial functionality in a portable means without prohibitive discomfort for the human user. Additionally, prior art designs for upper extremity robotic devices include mostly ground-based systems wherein these systems rely on shunting loads into some type of ground-based structure such as, for example, a ceiling, floor, or wall. Comparably, a device that may be considered fully flexible would generally not be controllable and effective for increasing load capacity and manipulation. Prior art wearable appliances generally rely on materials that are "non-stretch" in tension. These appliances are designed to account for applied forces in tension and not in compression. For a wearable robotic upper body garment, proper handling of applied loads is desirable, due to balancing the objectives of user comfort and operational control. There exists a need for a device that combines general flexibility as well as selective local and directional stiffness or rigidity to effectively increase load capacity and manipulation for a human user in a wearable and portable manner.

SUMMARY

The following summary introduces some aspects of the invention as a prelude to the more detailed description that is presented later, but is intended to neither define nor delineate the scope of the invention.

A wearable robotic upper body garment that strikes a balance between comfort for the user and operational effectiveness is generally desired and one or more embodiments are herein disclosed. A user's comfort may be enhanced with materials and components that are relatively soft and flexible as well as maintaining a degree of rigidity capable to counter loads applied to a limb and torso in order to implement joint motion.

The wearable robotic upper body garment is an active device in that it is capable of moving or assisting the movement of a human user's limbs and may be comprised of active actuators. The wearable robotic upper body garment is capable of effectively distributing loads away from the human user's shoulder areas and around the human user's torso as well as minimizing pressure points and interface migration, which is generally desirable. One or more embodiments of a wearable robotic upper body garment is described below wherein the one or more embodiments may be capable of providing directional stiffness through the use of a predetermined geometry and predetermined materials to make the garment stiff or rigid in certain locations and directions as well as flexible in other locations and directions.

The one or more embodiments of the wearable robotic upper body garment described below may be capable of actively controlling a human user's upper extremity such as for example a predetermined right or left shoulder and associated right or left elbow of a human user (or both right and left shoulder and right and left elbow). Such active control may be at least partially implemented by positioning a predetermined right or left arm in specific orientations and commanding movement and applied force(s) on a right arm, le arm, or both through desired motion (e.g., preprogrammed motion). The one or more embodiments of the wearable robotic upper body garment described herein uses a predetermined amount of semi-rigid or rigid components (to the minimal amount practicable) and force-controllable actuators. The wearable robotic upper body garment may be distinguished from a robotic appliance that is comprised of a mechanical or artificial joint. The wearable robotic upper body garment may be distinguished from a robotic appliance that relies on applied loads to be directed into an immovable structure, for example into a wall, the ceiling, or the floor.

DETAILED DESCRIPTION OF THE INVENTION

Figure 1:
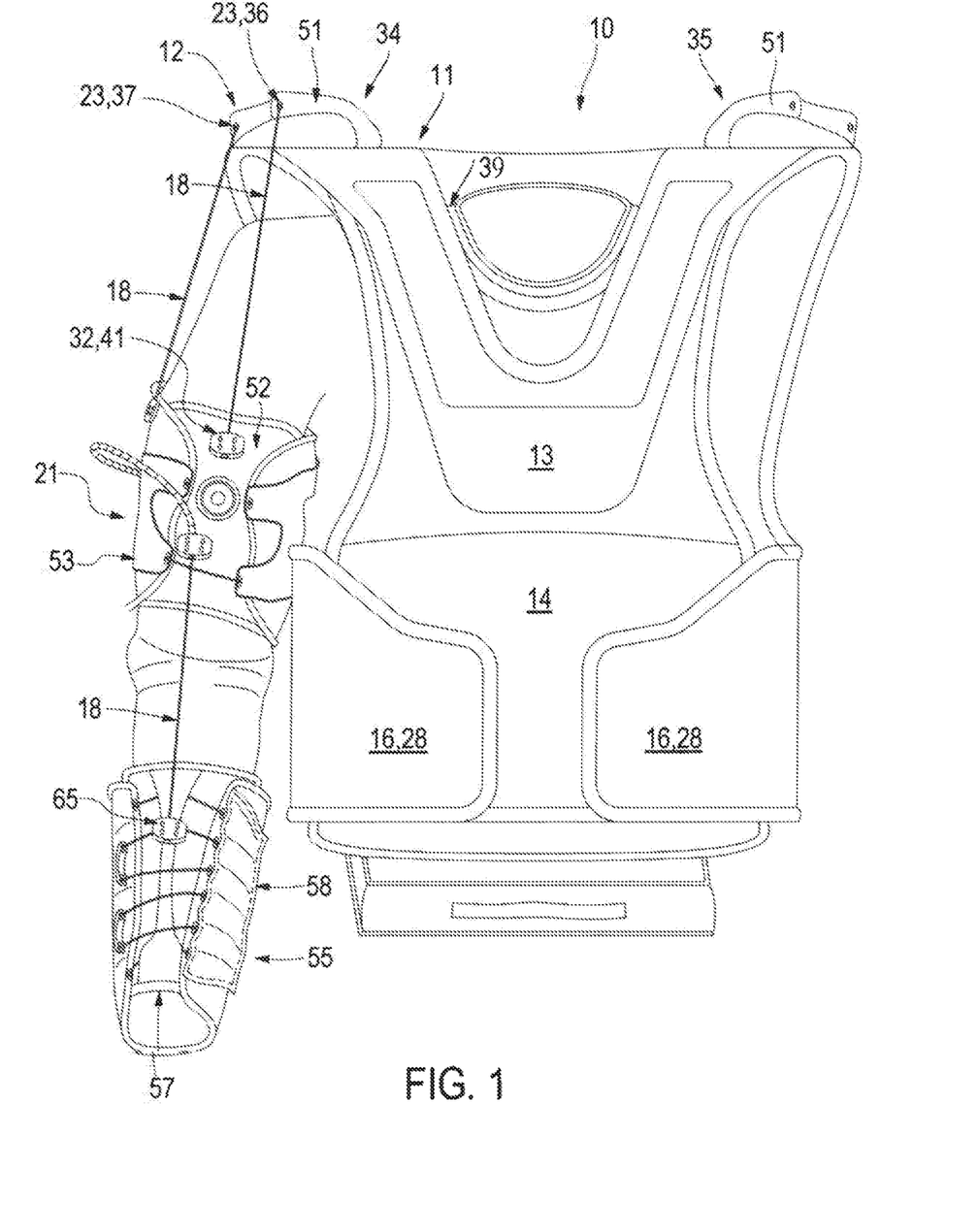
FIG. 1 is a front perspective view of an embodiment of a wearable robotic upper body garment.

With initial reference to FIG. 1, a first embodiment of a wearable robotic upper body garment (10) will now be described in additional detail. In an embodiment, the wearable robotic upper body garment (10) is not a ground-based system and does not rely on shunting loads into some type of ground-based structure such as, for example, a ceiling, floor, or wall. As illustrated in FIG. 1, a wearable robotic upper body garment (10) may be comprised of a shoulder saddle (11) wherein the shoulder saddle (11) may be comprised of one or more elevated shoulder sections (12) and a yoke (13). In an embodiment, the shoulder saddle (11) is not a ground-based system and does not rely on shunting loads into some type of ground-based structure such as, for example, a ceiling, floor, or wall. The yoke (13) may be comprised of a semi-rigid to rigid material that may be manufactured to be selectively stiff in different and multiple directions such as, for example, a carbon-fiber material, thin plastic such as e.g., ARMALON, fiberglass, or the like. The anterior facing side of the yoke (13) may be a generally V-shape comprising an open area for a human user's head to fit through wherein the anterior facing side of the yoke (13) may form a V-like shape. In an embodiment, the yoke's upper area may be wider as compared to the yoke's lower area. This particular design enhances the yoke's capability to distribute forces/loads away from a user's shoulder region and towards (to) the user's torso region. The one or more elevated shoulder sections (12) may be structurally interconnected with the yoke (13) in a seamless or semi-seamless manner. The yoke (13) may be capable of allowing flexibility in a predetermined first direction and resisting flexibility in a predetermined second direction thereby in combination with a front torso section (14), back torso section (15), and torso wrap (15) capable of transferring loads away from the shoulder region to the torso region. In an embodiment, the front torso section (14), back torso section (15), and torso wrap (15) are not ground-based systems and do not rely on shunting loads into some type of ground-based structure such as, for example, a ceiling, floor, or wall. In operations, the shoulder saddle (10) may be placed over the neck of a human user wherein the one or more elevated shoulder sections (12) may be comprised of a semi-rigid to rigid material such as carbon-fiber material (for example, carbon-fiber wrapped plastic), fiberglass, sheet metal, or the like. The one or more elevated shoulder sections (12) may be capable of transferring forces away from the human user's shoulder as will be discussed in more detail below. As will also be described in more detail below, the one or more elevated shoulder sections (12) in combination with the yoke (13) may be capable of transferring forces away from the human user's shoulder and distributing forces towards or into the human user's torso.

Figure 2:
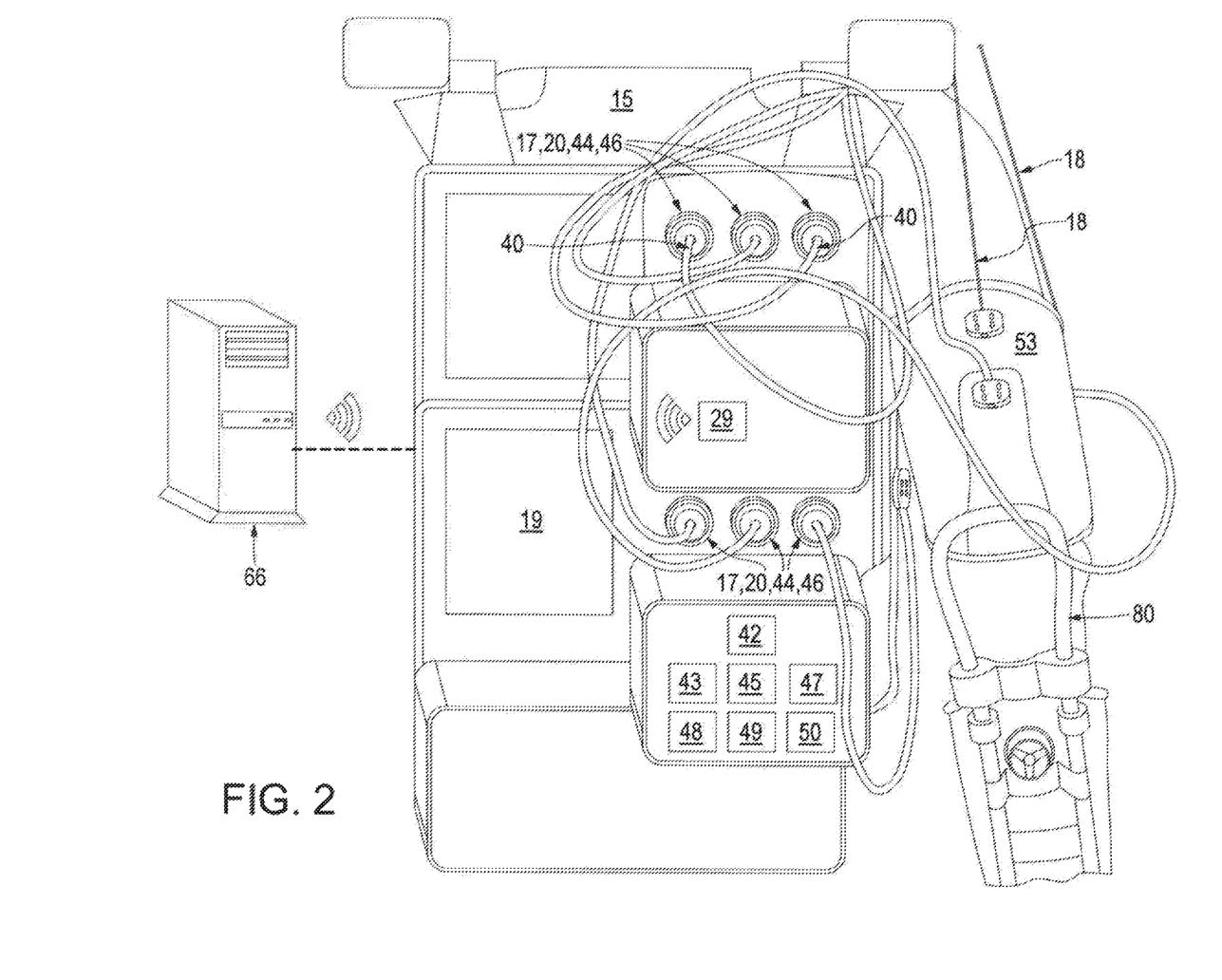
FIG. 2 is a rear perspective view of an embodiment of a wearable robotic upper body garment.

With particular reference to FIGS. 1 and 2, an embodiment of the wearable robotic upper body garment (10) will now be more fully described. The wearable robotic upper body garment (10) may be further comprised of a front torso section (14) and aback torso section (15). The front torso section (14) and back torso section (15) may be comprised of semi-flexible to flexible material such as non-stretch and layered fabrics, carbon-fiber material (e.g., carbon-fiber wrapped plastic), fiberglass, sheet metal, plastic such as e.g., ARMALON, or the like. The front torso section (14) and back torso section (15) may be, for example, a flap, tab, apron, etc. The yoke (13) may be structurally connected or attached to the front torso section (14), the back torso section (15), or both. In an embodiment, a torso wrap (16) (aka a ribcage wrap) may be structurally connected or attached to the back torso section (15) wherein the torso wrap (16) may be comprised of two or more components (28). In another embodiment, a torso wrap (16) may be structurally integrated with the back torso section (15) comprising one continuous section of material or compliant material such as, for example, fabric with semi-rigid or rigid elements assimilated into the integrated torso wrap (15) and back torso section (15) in one or more layers. The torso wrap (16) may be comprised of semi-flexible to flexible material such as, for example, non-stretch and layered fabrics, carbon-fiber material (e.g., carbon-fiber wrapped plastic), fiberglass, sheet metal, or the like. The two or more components (28) may be structurally connected to each other, to the front torso section (14), to the back torso section (15), or any combination such as by semi-rigid or rigid means as well as by means of VELCRO® or the like or in any combination. As an example and in an embodiment, when the torso wrap's (16) two or more components (28) are temporarily and structurally connected to each other and/or to the front torso section (14), the torso wrap (16) in combination with the front torso section (14) and the back torso section (15) as well as the yoke (13) are capable of transferring forces away from the human user's shoulder and distributing forces into or to the human user's torso. The capability of transferring forces away from the human user's shoulder and distributing forces into the human user's torso may be based on ergonomic desires or needs and specifically, a human user's comfort.

With continued reference to FIGS. 1 and 2, one or more actuators (17) may be each comprised of one or more motors (20). Additionally, the one or more actuators (17) may be each further comprised of one or more pulleys (73). The type of actuator may be selected based on a particular set of requirements. The one or more actuators (17) may be, for example, electric actuators, hydraulic actuators, pneumatic actuators, series elastic actuators, or any combination. In an embodiment, one or more base units (19) may be incorporated or utilized to structurally support the one or more actuators (17). In an embodiment, the one or more actuators (17) are structurally connected to one or more base units (19). Additionally, each base unit (19) may be structurally connected or attached to the back torso section (15), the front torso section (14), or any combination, away from the human user's limbs. In an embodiment, the one or more base units (19) are not ground-based systems and do not rely on shunting loads into some type of ground-based structure such as, for example, a ceiling, floor, or wall. Additionally, one or more flexible tendons (18) may be operationally connected or in operational relationship to a predetermined one or more actuators (17), one or more motors (20), one or more pulleys (73), or any combination. In an embodiment, the one or more flexible tendons are operationally connected to a predetermined one or more actuators (17), one or more motors (20), one or more pulleys (73), or any combination at the one or more tendons' (20) proximal ends (40).

With continued reference to FIGS. 1 and 2, a predetermined number of the one or more flexible tendons (18) operationally associated with each actuator (17), motor (20), pulley (73), or any combination may be routed through or around a predetermined one or more elevated shoulder sections (12) and torso wrap (16) at predetermined locations (23). In an embodiment, a predetermined one or more flexible tendons (18) is in operational relationship to a predetermined one or more pulley (73) wherein the motor (20) may impart a pulling motion on the predetermined one or more flexible tendon (18) and therein spin the predetermined one or more pulley (73). In another embodiment, a predetermined one or more flexible tendon (18) is operationally connected to a predetermined one or more pulley (73) wherein the motor (20) is operationally connected to the predetermined one or more pulley (73). In this particular embodiment, the motor (20) may spin the predetermined one or more pulley (73) thereby imparting a pulling motion on the predetermined one or more flexible tendon (18). Additionally, a predetermined number of the one or more flexible tendons (18) operationally associated with each actuator (17), motor (20), pulley (73), or any combination may be routed through or around a predetermined location on the torso wrap (16), back torso section (15), front torso section (14), or any combination. In an embodiment, the means for routing (67) through or around a predetermined one of the one or more elevated shoulder sections (12) at predetermined locations (23) may be accomplished by one or more conduits (24), one or more eyelets, one or more second pulleys, etc. In an embodiment, one or more conduits (24) may comprise a first conduit (36), second conduit (37), third conduit (38), fourth conduit (70), or any combination. In an embodiment, the first, second, and third conduits (36,37,38) may be located on one of the one or more elevated shoulder sections (12) and the fourth conduit (70) may be located on the torso wrap (16).

With continued reference to FIGS. 1 and 2, the wearable robotic upper body garment (10) may be further comprised of one or more upper arm cuffs (aka biceps cuffs) (21). The one or more upper arm cuffs (21) may be temporarily attached to a predetermined upper arm region (22) of the human user. In an embodiment, the one or more upper arm cuffs (21) are not ground-based systems and do not rely on shunting loads into some type of ground-based structure such as, for example, a ceiling, floor, or wall. The one or more upper arm cuffs (21) may be comprised of a combination of semi-flexible to flexible materials as well as semi-rigid to rigid materials such as, for example, non-stretch and layered fabrics, carbon-fiber material (e.g., carbon-fiber wrapped plastic), fiberglass, sheet metal, or the like. The proximal end (40) of each flexible tendon (18) may be operationally connected or attached to one of the one or more actuators' (17) one or more motors (20) or one or more pulleys (73). In an embodiment, a flexible tendon (18) may be in operational relationship with an upper arm cuff (21). In an embodiment, the distal end (41) of each flexible tendon may be operationally and/or structurally connected or attached to a predetermined location on one of the one or more upper arm cuffs (21) at a first termination point (32). In another embodiment, the distal end (41) of each flexible tendon (18) may be routed through a predetermined location on one of the one or more upper arm cuffs (21) and attached to a predetermined location on a predetermined one or more lower arm cuffs (55) at a second termination point (65). Whether the distal end (41) of a predetermined flexible tendon (18) is operationally or structurally connected to an upper arm cuff (21) or routed through an upper arm cuff (21) the flexible tendon (18) is considered to be in operational relationship with the upper arm cuff (21). In an embodiment, the one or more first termination points (32) and second termination points (65) may be integrated on the one or more upper arm cuffs (21) and one or more lower arm cuffs (55), respectively, and may be constructed of plastic or metal hardware or the like. The one or more upper arm cuffs (21) and one or more lower arm cuffs (55) may be semi-rigid or rigid in the axial and radial directions to mitigate the migration or relative deflection of the one or more first and second termination points (32,65). A service unit (29) may also be further comprised of an electronics subsystem (42), software (43), one or more sensors (44), and a power supply (45) such as, for example, a battery (46). The service unit (29) may be structurally connected or installed on the front torso section (14) or back torso section (15). The service unit (29) may be structurally connected to or in proximal spatial relationship with a base unit (19), front torso section (14), or back torso section (15). With respect to the one or more sensors (44), the one or more sensors (44) may be comprised of one or more force sensors (46) capable of operating the one or more actuators (17) for purposes of force control and impedance control of one or both of the human user's arms. In an embodiment, the one or more force sensors (46) may be located in proximate spatial relationship to the one or more actuators (17) or one or more motors (20). The employment of one or more force sensors (46) enable(s) increased control of the human user's one or more arms due to, in part, heightened reception of external forces from the human user. The combination of the one or more force sensors (46), the one or more actuators (17), electronics subsystem (42), and software (43) may enable enhanced maintenance of commanded joint angles even in the presence of applied forces from the human user, which may be preferred for a synergistic feel between the wearable robotic upper body garment (10) and the human user, as a natural spring-damper feel may be programmed. With respect to the electronics subsystem (42), the electronics subsystem (42) may be comprised of a processor (47) wherein the processor (47) may be comprised of a computer. The electronics subsystem (42) may be further comprised of a power distribution subsystem (48) and an electronics pack (49). The electronics pack (49) may be comprised of one or more motor drivers (50).

Figure 3:
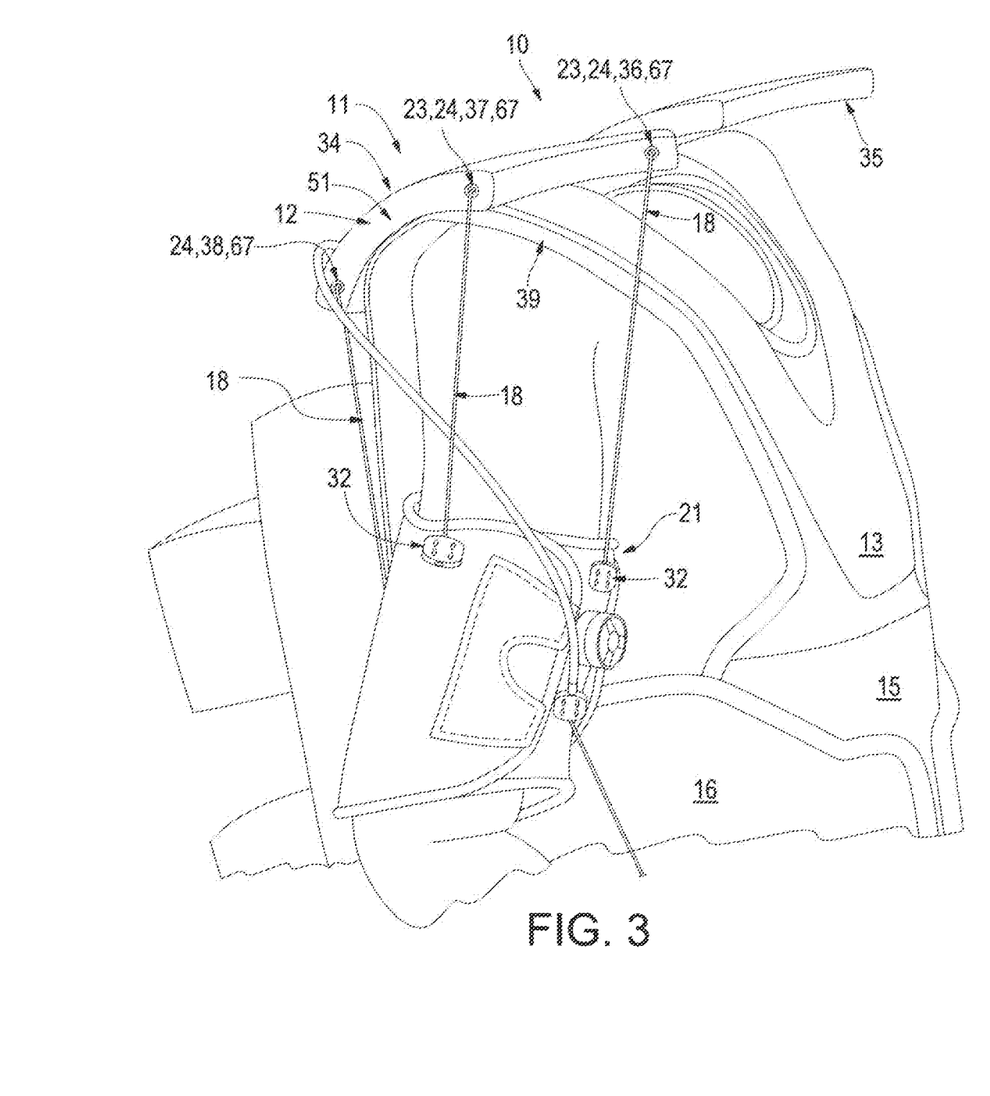
FIG. 3 is a perspective view of a shoulder saddle.

With particular reference to FIG. 3, an embodiment of a shoulder saddle (11) will now be more fully described. The shoulder saddle (11) may be comprised of one or more elevated shoulder sections (12) and a yoke (13). In an embodiment, the shoulder saddle (11) may be comprised of a right and left elevated shoulder section (34,35). FIG. 3 illustrates a right elevated shoulder section (34). The yoke (13) may be comprised of a semi-rigid to rigid material such as, for example, a carbon-fiber material (for example, carbon-fiber wrapped plastic), fiberglass, plastic, sheet metal, or the like. The one or more elevated shoulder sections (12) may be structurally connected to the yoke (13). In an embodiment, the one or more elevated shoulder sections (12) may be interconnected with the yoke (13) to form a single structural component. In an embodiment, the one or more elevated shoulder sections (12) may be semi-rigidly or rigidly connected to the yoke (13). Each of the one or more elevated shoulder sections may be comprised of a shoulder rest (39) and one or more extension portions (51) wherein the shoulder rest (39) and one or more extension portions (51) may be interconnected to form a single structural component. The shoulder rest (39) may be shaped in a predetermined shape. In an embodiment, a predetermined shape may conform to one or more human users' shoulder area. Each or a predetermined number of the one or more extension portions (51) may be cantilevered in design. The cantilevered design of the extension portions (51) may be capable of locating the one or more flexible tendons (18) a predetermined distance away from a human user's arm for purposes of avoiding or mitigating contact of the one or more flexible tendons (18) with the human user's arm. During operations, the one or more flexible tendons (18) apply forces to the shoulder saddle (11) wherein the applied forces are a consequence of a predetermined actuator/motor's operation. The combination of the shoulder rest (39) and one or more extension portions (51) may be capable of distributing applied forces away from the human user's shoulder area as well as increasing an associated moment arm (aka lever arm) for a predetermined one or more flexible tendons (18). Further, the combination of the shoulder saddle (11), the yoke (13), the front torso section (14), the back torso section (15), and the torso wrap (16) serves to distribute applied forces away from the human user's shoulder area and towards or to the human user's torso area. The one or more flexible tendons (18) may be routed from the one or more motors (20) or pulleys (73) attached to the back torso section (15) or front torso section (14) wherein the routed path includes routing around or through a predetermined elevated shoulder section (12) or the front torso section (14), back torso section (15), or torso wrap (16). As illustrated in FIG. 3, the means for routing (67) through or around a predetermined one of the one or more elevated shoulder sections (12) and torso wrap (16) at predetermined locations (23) may be accomplished by one or more conduits (24) encapsulated within the one or more shoulder sections (12) and torso wrap (16). The number and location of the one or more conduits (24) may be predetermined based on the unique requirements of an application of a particular embodiment of the wearable robotic upper body garment (10). As illustrated in FIG. 3, in an embodiment, a first, second, and third conduit (36,37,38) may be located on the right elevated shoulder section (34). The first conduit (36) may be located on the anterior portion of the elevated shoulder section (34). The third conduit (38) may be located on the posterior portion of the elevated shoulder section (34). The second conduit (37) may be located at or near the right side or right lateral facing side of the elevated shoulder section (34). The one or more flexible tendons (18) may actuate by "pulling" and not "pushing." The proximal end (40) of each of the one or more flexible tendons (18) may be operationally connected or attached to a predetermined one or more actuators (17), motors (20), or pulleys (73). In an embodiment, the one or more first termination points (32) serve as attachment points for the distal ends (41) of an associated one or more flexible tendons (18). In an embodiment, the one or more first termination points (32) may be located on a predetermined upper arm cuff (21), which will be more fully discussed below. The shoulder saddle (11) may be further comprised of an integrated shoulder retraction system (33). The integrated shoulder retraction system (33) provides a means for retracting the shoulders to allow for movements that may be more beneficial to rehabilitation, assistance, or augmentation, and to constrain scapular movement.

Figure 4:
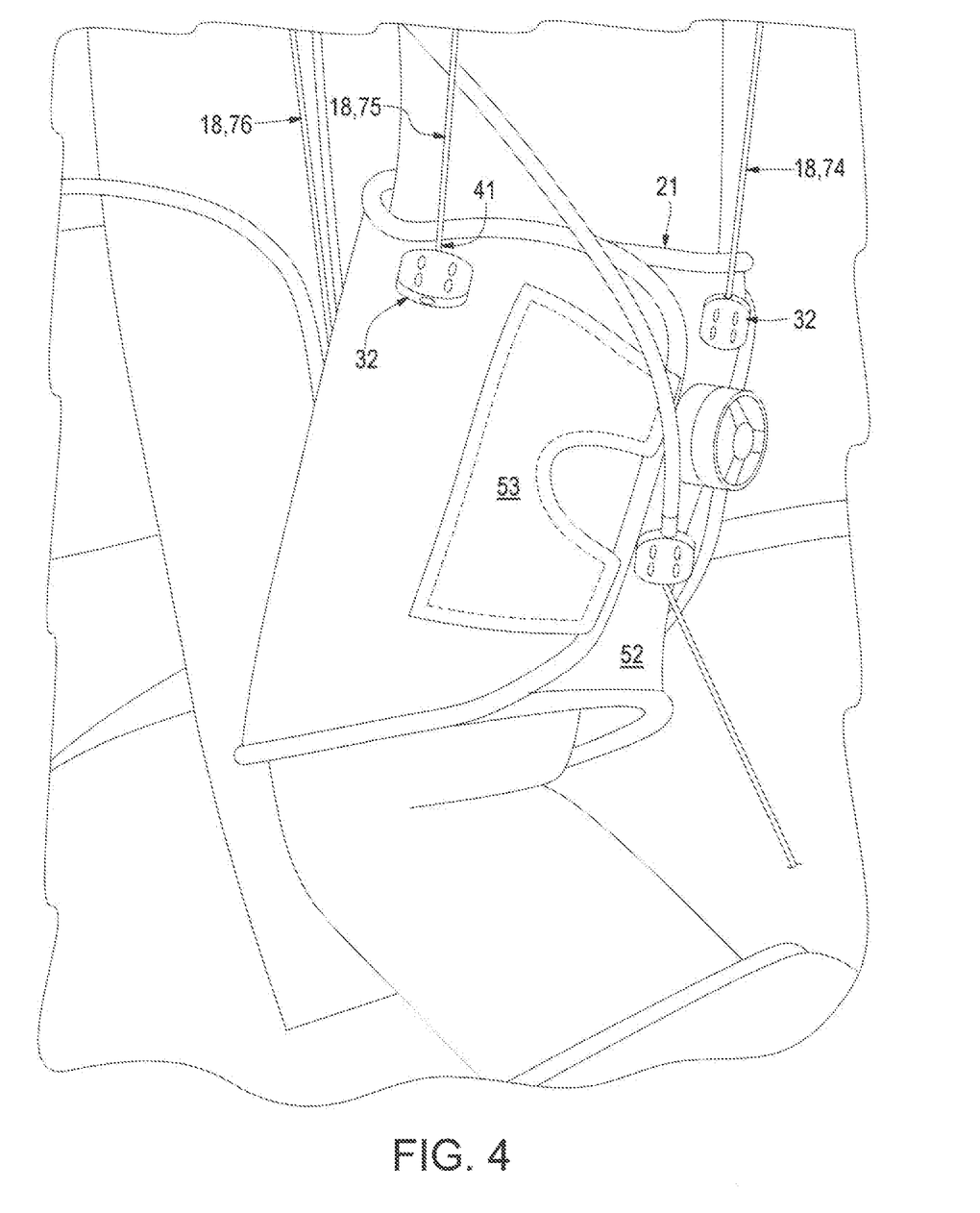
FIG. 4 is a perspective view of an upper arm cuff.

With particular reference to FIG. 4, an embodiment of an upper arm cuff (21) will be more fully described. In an embodiment, the one or more upper arm cuffs (21) are not ground-based systems and do not rely on shunting loads into some type of ground-based structure such as, for example, a ceiling, floor, or wall. Each of the one or more upper arm cuffs (aka biceps cuffs) (21) may be comprised of an anterior section (52) and a posterior section (53). The anterior section (52) and posterior section (53) may be donned by the human user and temporarily attached to each other in a semi-rigid or rigid manner. The means for temporarily attaching the anterior section (52) and posterior section (53) of an upper arm cuff may be comprised of a combination of male and female clips, integrated wire laces, ratchet mechanisms, or any combination. In an embodiment, a predetermined one or more flexible tendons' (18) distal end (41) may terminate at a predetermined location on an upper arm cuff (21). Upper arm cuff (21) tendon one or more first termination points (32) may be determined by constructing the tendon vectors necessary for adequate control in the desired degrees of freedom. For example, for control about a DOF, there may be a requirement for a first tendon vector to effectuate motion (e.g., rotation about a predetermined joint) in a first direction, and a second tendon vector that causes rotation in the opposite direction. In an embodiment, a first flexible tendon (74) routed through a first conduit (36) may terminate at a first predetermined first termination point (32) located in the anterior region of an upper arm cuff (21). Additionally, a second flexible tendon (75) routed through a second conduit (37) may terminate at a second predetermined first termination point (32) located in the lateral region of an upper arm cuff (21). Still further, a third flexible tendon (76) routed through a third conduit (38) may terminate at a third predetermined first termination point (32) in the posterior region of an upper arm cuff (21). Finally, a fourth flexible tendon (77) routed through a fourth conduit (70) may terminate at a fourth predetermined first termination point (32) located in the medial region of an upper arm cuff (21). The combination of the first and third flexible tendons in this embodiment may effectuate, among others, shoulder flexion/extension movement and control, depending on current shoulder joint angles. The combination of the second and fourth flexible tendons (75,77) in this embodiment may effectuate, among others, shoulder abduction/adduction movement and control, depending on current shoulder joint angles. In another embodiment, the one or more flexible tendons (18) may be routed through a predetermined location on or around an upper arm cuff (21) wherein the one or more flexible tendons' (18) distal end (41) may terminate at a predetermined location on a lower arm cuff (55). In an embodiment, the overall shape formed by the anterior section (52) and posterior section (53) may be conical in nature. The generally conical shape may provide additional support during operations by utilizing the natural generally conical shape of a human user's arm to mitigate migration of an upper arm cuff (21) upwards towards a human user's shoulder as one or more flexible tendons (18) "pull" an upper arm cuff (21). The pulling motion of the one or more flexible tendons (18) is a consequence of operations or engagement of the one or more actuators' (17) one or more motors (20). In an embodiment, the one or more upper arm cuffs (21) are adjustable where the distal ends (41) of the one or more flexible tendons (18) may terminate on a predetermined location on an upper arm cuff (21).

Figure 5:
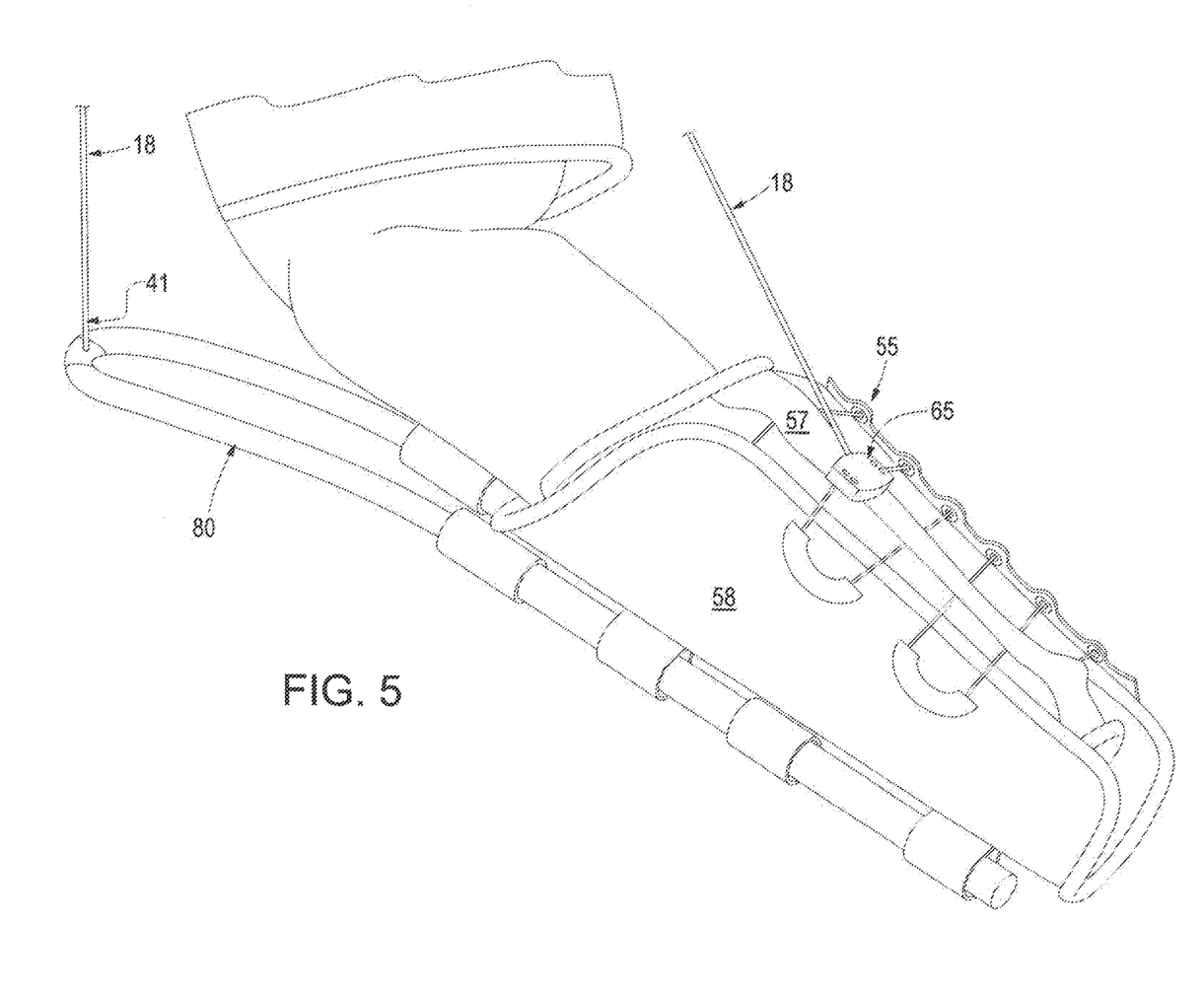
FIG. 5 is a perspective view of a lower arm cuff.

With particular reference to FIG. 5, an embodiment of a lower arm cuff (aka forearm cuff) (55) will be more fully described. In an embodiment, the one or more lower arm cuffs (55) are not ground-based system and do not rely on shunting loads into some type of ground-based structure such as, for example, a ceiling, floor, or wall. Each of the one or more lower arm cuffs (55) may be comprised of a front section (57) and back section (58). The front section (57) and back section (58) may be donned by the human user and temporarily attached to each other in a semi-rigid or rigid manner. In an embodiment, the overall shape of a lower arm cuff (55) formed by the front section (57) and back section (58) may be conical in nature. The generally conical shape may provide additional support during operations by utilizing the natural generally conical shape of a human user's lower arm to mitigate migration of a lower arm cuff (55) upwards towards a human user's elbow as one or more flexible tendons (18) "pull" a lower arm cuff (55). The front section (57), back section (58), or both may be comprised of semi-rigid straps (71) or webbing material (72) that are capable of resisting flexibility in tension but allowing for flexibility in compression. In an embodiment, a lower arm cuff (55) may be in operational relationship with an upper arm cuff (21) by means of these semi-rigid straps or webbing material across the approximate axis of elbow flexion/extension rotation so as not to impede such rotation. This embodiment leverages the natural cone shape of the lower arm as well as grounds the particular upper arm cuff (21), preventing the particular lower arm cuff (55) from moving proximally during tendon pulling (aka during actuator or motor operations). In another embodiment, a lower arm cuff (55) may be in operational relationship with an upper arm cuff (21) by means of a flexible tendon (18) routed through the upper an cuff (21) and terminating at a second termination point (65) located on the lower arm cuff (55). The means for temporarily attaching the front section (57) and back section (58) of a lower arm cuff (55) may be comprised of a combination of male and female clips, integrated wire laces, ratchet mechanisms, or any combination. In an embodiment, an elbow extension bar (80) may be rigidly or semi-rigidly attached to the lower arm cuff (55) in a predetermined location such that the distal end (41) of one or more flexible tendons (18) may attach to the elbow extension bar (80), and impart elbow extension motion to the user when the flexible tendon is pulled by the motor (20), actuator (17), or pulley (73). The method of attachment of the elbow extension bar (80) to the lower arm cuff (55) may be through use of webbing, stitching, adhesive, fasteners, or the like. The elbow extension bar (80) may be adjustable, by sliding axially and circumferentially along the forearm, and may be able to lock in place, for example via a friction clamp, set screw, or the like. The elbow extension bar (80) may be rigid, constructed from materials such as carbon fiber-wrapped plastic, metal, or the like.

An embodiment for operation of the wearable robotic upper body garment (10) will now be described. The wearable robotic upper body garment (10) may be donned on the human user. In an embodiment, the step of donning includes placing the one or more shoulder rests (39) on a human user's shoulder area. In another embodiment, the step of donning includes locating the wearable robotic upper body garment (10) above the user's head, lowering the wearable robotic upper body garment (10) such that the one or more shoulder rests (39) contact the user's shoulder area(s), and structurally connecting the torso wrap (16) to the front torso section (14). After the wearable robotic upper body garment (10) is donned, an operator may interface the wearable robotic upper body garment's (10) processor (47) to an off-board computer (66). For purposes of rehabilitation (aka physical therapy), the operator may select a desired joint trajectory and speed for the human user (aka patient) to adhere to. The patient may have visual feedback of his/her real-time joint angle and the desired joint angles, allowing him/her to adjust his/her movement to match the desired trajectory. The operator can select how much resistance/assistance (and which direction) may be applied to the patient by any combination of the one or more actuators (17), one or more motors (20), and one or more flexible tendons (18) on a predetermined joint's predetermined one or more degrees of freedom, depending on a predetermined rehabilitation protocol. A predetermined rehabilitation protocol may allow at least one DOF of the human user's shoulder to be controlled in one position, while a predetermined elbow of the human user would be free to move in accordance with input from the human user. The foregoing allows for isolation of joint movements, which is a beneficial part of physical therapy. In an analogous mode, the wearable robotic upper body garment (10) may attempt to null out any errors between desired (e.g., programmed) and actual joint angles, which may simulate a spring-damper feel. In yet another mode, the wearable robotic upper body garment (10) simply follows a desired trajectory for each controlled degree-of-freedom simultaneously, allowing the human user to perform pre-programmed motions (e.g., motions that simulate activities of daily life) that he/she may not be able to perform without assistance. In an embodiment, the electronics subsystem (42) in combination with the software (43) provide a means for implementing one or more control modes. For example, in an active assist mode, the shoulder abduction and flexion as well as elbow flexion may be commanded either simultaneously by coordinated control or individually while holding a predetermined position and/or orientation with respect to other predetermined joints.

Additionally, for example, in a passive assist mode, the human user may freely move his/her arm(s) while the electronics subsystem (42) in combination with the software (43) provide a means for controlling a predetermined amount of torque to one or more predetermined shoulder and elbow degrees of freedom. In another embodiment, the wearable robotic upper body garment (10) may be comprised of one or more motion stops capable of allowing the human user or physical therapist to stop power to the one or more motors (20). The software (43) may continuously monitor for predetermined unsafe conditions and stop power to the one or more motors (20) upon finding such a predetermined unsafe condition.

Figure 6:
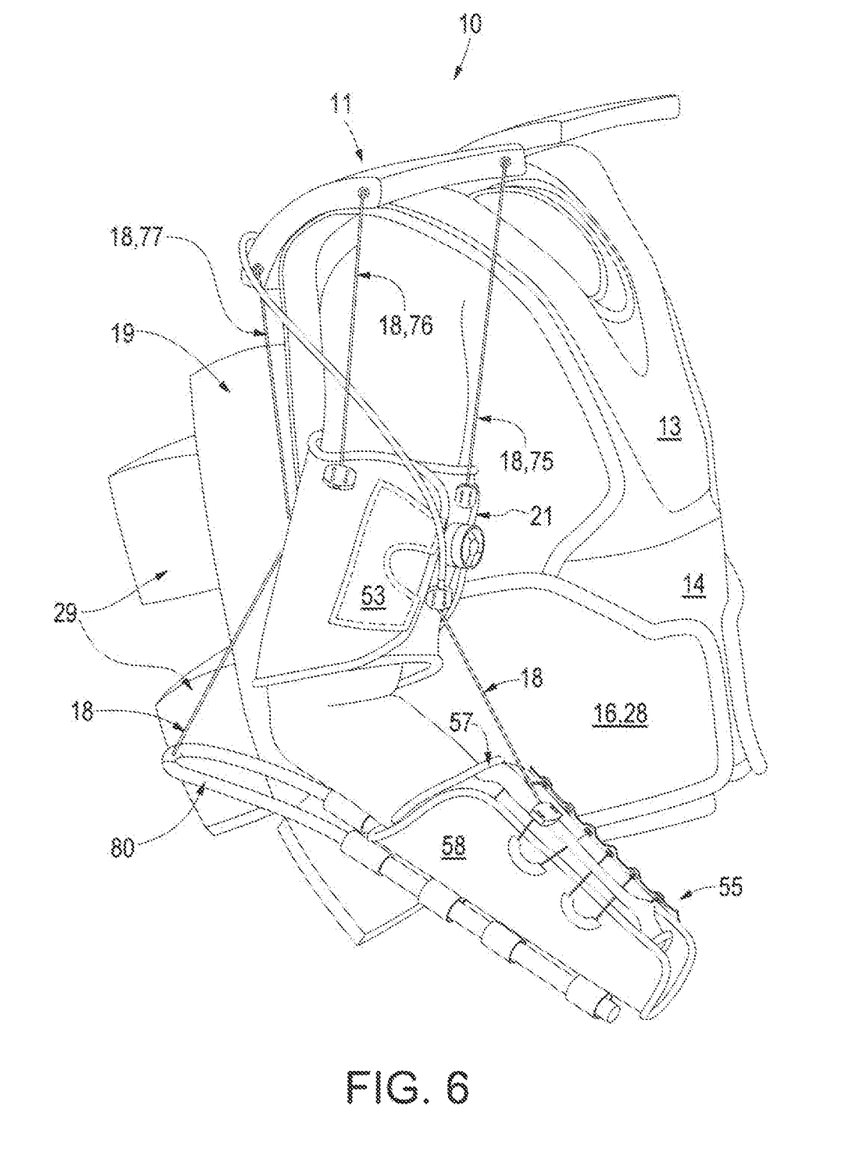
FIG. 6 is a perspective view of a shoulder saddle, upper arm cuff, and lower arm cuff.
Figure 7:
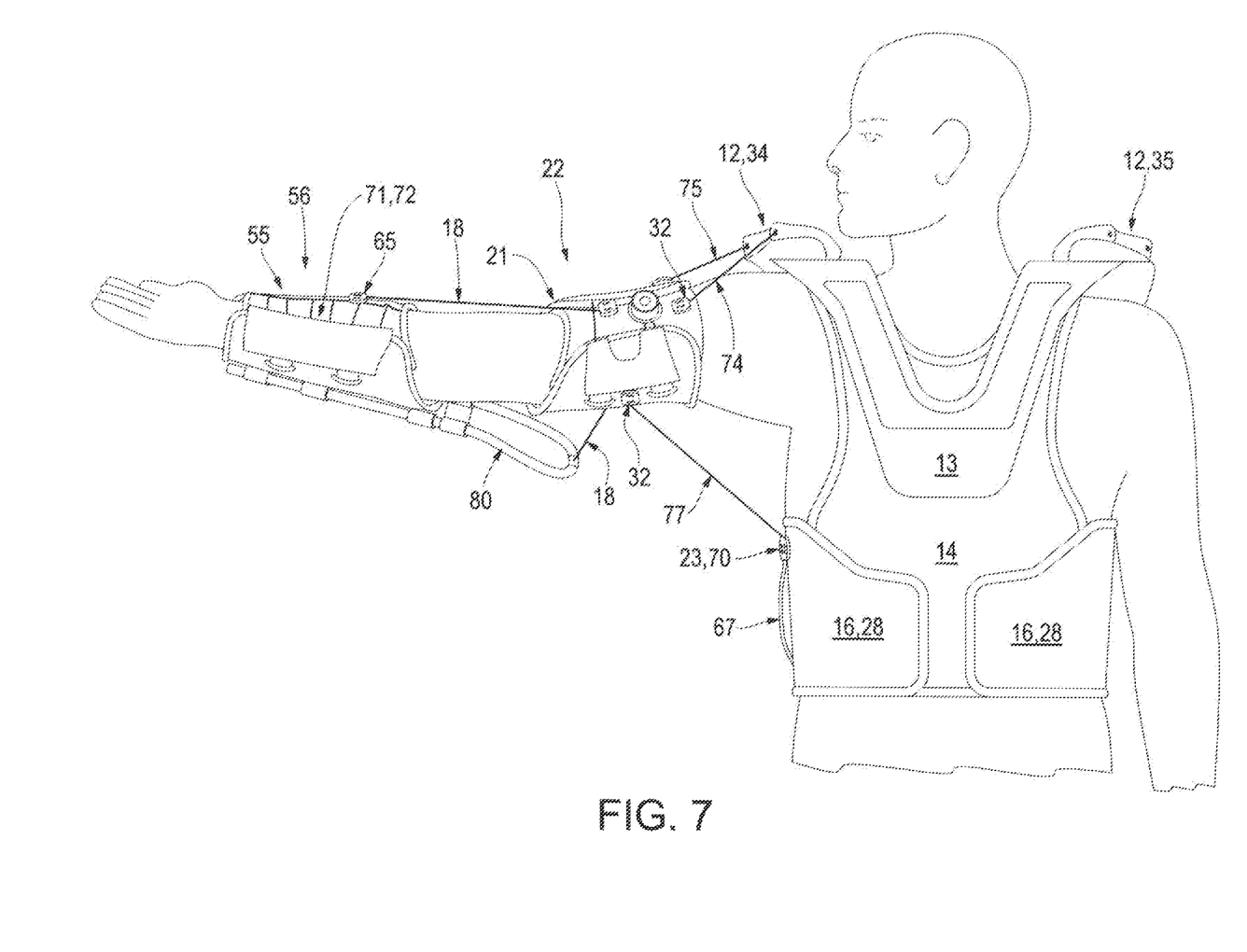
FIG. 7 is a perspective view of an embodiment of the shoulder saddle, yoke, front torso section, back torso section, and torso wrap donned on a human user.

Another embodiment for operation of the wearable robotic upper body garment (10) will now be more fully described. With particular reference to the embodiment illustrated in FIGS. 1, 2, and 6 one or more actuators (17) are structurally connected to a back torso section (5), away from a human user's arm when the wearable robotic upper body garment is donned by the human user. In an embodiment, as the one or more actuators' (17) one or more motors (20) operate or engage to pull the one or more flexible tendons (18), the one or more flexible tendons (18) assist the human user to move his/her arm about a predetermined joint (e.g., an elbow joint and/or a shoulder joint). Such movement amounts to active control of the user's armor upper extremity. Further, the combination of the shoulder saddle (11) (comprised of the one or more elevated shoulder sections (12) and the yoke (13)), the front torso section (14), the back torso section (15), and the torso wrap (16) serves to distribute applied forces (as a consequence of operation of the one or more actuators' (17) one or more motors (20)) away from the human user's shoulder area(s) and towards (to) the human user's torso area. In an embodiment, force sensing by the one or more sensors (44) in operational relationship with the one or more actuators (17) may be employed to enable a predetermined amount of force feedback control and impedance control of the human user's arm. Such control may enable enhanced control of the human user's arm, reception of external forces (e.g., as initiated by the human user), and maintenance of commanded joint angles even in the presence of the external forces in a predetermined compliant fashion.

The foregoing descriptions, for purpose of explanation, have been described with reference to specific embodiments. However, the illustrative discussions above are not intended to be exhaustive or to limit the invention to the precise forms disclosed. Many modifications and variations are possible in view of the above teachings. Moreover, the order in which the steps and associated limitations of any methods described herein are illustrative in nature and may be re-arranged in multiple combinations. The embodiments were chosen and described to explain the principles of the invention and its practical applications, to thereby enable others skilled in the art to utilize the invention and various embodiments with various modifications as are suited to a particular contemplated use.

What is claimed is:

1. An upper-body apparatus comprising:
    a shoulder saddle wherein said shoulder saddle is comprised of a yoke and one or more elevated shoulder sections, wherein said one or more elevated shoulder sections is comprised of a first elevated shoulder section;
    a back torso section structurally connected to said yoke;
    a front torso section structurally connected to said yoke;
    one or more actuators each structurally connected to either said back torso section or said front torso section wherein each of said one or more actuators are comprised of one or more motors and wherein said one or more motors is comprised of a first motor and a second motor;
    one or more flexible tendons operationally connected to a predetermined one of said one or more actuators, wherein said one or more flexible tendons is comprised of a first flexible tendon and a second flexible tendon and wherein said first flexible tendon is operationally connected to said first motor;
    an upper arm cuff in operational relationship with said one or more flexible tendons; and
    a lower arm cuff in operational relationship with said one or more flexible tendons;
    wherein said first flexible tendon is routed from said first motor through or around said first elevated shoulder section at a first predetermined position on said first elevated shoulder section,
    wherein said first flexible tendon is connected to said upper arm cuff at a first predetermined termination point,
    wherein said second flexible tendon is operationally connected to said second motor and routed from said second motor through or around said first elevated shoulder section at a second predetermined position on said first elevated shoulder section,
    wherein said second flexible tendon is connected to said upper arm cuff at a second predetermined termination point,
    wherein said one or more flexible tendons is further comprised of a third flexible tendon,
    wherein said third flexible tendon is routed from said one or more motors through or around said first elevated shoulder section at a third predetermined position on said first elevated shoulder section,
    wherein said third flexible tendon is connected to said upper arm cuff at a third predetermined termination point,
    wherein said first flexible tendon, said second flexible tendon, and said third flexible tendon are configured to effectuate shoulder movement of a user,
    wherein said upper arm cuff is comprised of an anterior section, a lateral section, a medial section, and a posterior section,
    wherein said first predetermined position is located on an anterior side of said first elevated shoulder section,
    wherein said second predetermined position is located on a lateral side of said first elevated shoulder section,
    wherein said third predetermined position is located on a posterior side of said first elevated shoulder section,
    wherein said first predetermined termination point is located on said anterior section of said upper arm cuff,
    wherein said second predetermined termination point is located on said posterior lateral section of said upper arm cuff,
    wherein said third predetermined termination point is located on said posterior section of said upper arm cuff,
    wherein said one or more flexible tendons is further comprised of a fourth flexible tendon,
    wherein said fourth flexible tendon is routed from said one or more motors and is connected to said upper arm cuff at a fourth predetermined termination point,
    wherein said fourth predetermined termination point is located on said medial section of said upper arm cuff, wherein said fourth flexible tendon is configured to effectuate shoulder movement of said user, wherein said first flexible tendon and said third flexible tendon are configured in combination to move a shoulder of said user of the upper body apparatus in a shoulder flexion movement and a shoulder extension movement, and wherein said second flexible tendon and said fourth flexible tendon are configured in combination to move the shoulder of the user of the upper body apparatus in a shoulder abduction movement and a shoulder adduction movement.

2. The apparatus of claim 1, wherein said shoulder saddle includes a shoulder rest configured to conform to the shoulder of said user, wherein said first elevated shoulder section includes an extension portion interconnected to the shoulder rest, and wherein the yoke interconnects the shoulder rest to the extension portion and is configured to elevate said extension portion from said shoulder rest to form a gap between said extension portion and said shoulder rest so as to distance said extension portion from the shoulder of the user.

3. The apparatus of claim 2, further comprising a torso wrap structurally connected to said back torso section and capable of structural connection with said front torso section, wherein said extension portion has a cantilevered design configured to position said first flexible tendon and said second flexible tendon at a predetermined distance away from the shoulder of the user, and wherein said extension portion is configured to be elevated above said shoulder rest to distribute an applied force from said first flexible tendon and said second flexible tendon away from the shoulder of the user and through said yoke, through said torso wrap, and to a torso of the user.

4. The apparatus of claim 1, wherein said first elevated shoulder section includes a first conduit where said first conduit extends from said one or more motors to said first elevated shoulder section, wherein said first flexible tendon extends from a proximal end operationally connected to one of said one or more motors and through said first conduit from said one or more motors to said first elevated shoulder section and said first flexible tendon extends out of the conduit and attaches at a distal end to the first predetermined termination point, and wherein said first flexible tendon actuates said shoulder movement by pulling said first tendon though said first conduit.

5. A method for actively controlling an upper extremity of a user, comprising:
providing an upper-body apparatus comprising:
a shoulder saddle wherein said shoulder saddle is comprised of a yoke and a first elevated shoulder section;
a back torso section structurally connected to said yoke;
a front torso section structurally connected to said yoke;
a torso wrap structurally connected to said back torso section and capable of structural connection with said front torso section, wherein the torso wrap is comprised of two or more components;
one or more actuators each structurally connected to either said back torso section or front torso section wherein each of said one or more actuators are comprised of one or more motors;

one or more flexible tendons operationally connected to a predetermined one of said one or more actuators, wherein said one or more flexible tendons is comprised of a first flexible tendon, a second flexible tendon, a third flexible tendon, and a fourth flexible tendon;
an upper arm cuff in operational relationship with said one or more flexible tendons;
a lower arm cuff in operational relationship with said one or more flexible tendons;
wherein said first flexible tendon is routed from said one or more motors to said first elevated shoulder section at a first predetermined position on said first elevated shoulder section, wherein said first flexible tendon is connected to said upper arm cuff at a first predetermined termination point,
wherein said second flexible tendon is operationally connected to said one or more motors and routed from said one or more motors to said first elevated shoulder section at a second predetermined position on said first elevated shoulder section, wherein said second flexible tendon is connected to said upper arm cuff at a second predetermined termination point,
wherein said third flexible tendon is routed from said one or more motors to said first elevated shoulder section at a third predetermined position on said first elevated shoulder section, wherein said third flexible tendon is connected to said upper arm cuff at a third predetermined termination point,
wherein said fourth flexible tendon is routed from said one or more motors and is connected to said upper arm cuff at a fourth predetermined termination point, and
wherein said first flexible tendon, said second flexible tendon, said third flexible tendon, and said fourth flexible tendon are configured to effectuate shoulder movement of the user,
wherein said upper arm cuff includes an anterior section, a lateral section, a medial section, and a posterior section,
wherein said first predetermined position is located on an anterior side of said first elevated shoulder section, said second predetermined position is located on a lateral side of said first elevated shoulder section, and said third predetermined position is located on a posterior side of said first elevated shoulder section,
wherein said first predetermined termination point is located on said anterior section of said upper arm cuff,
wherein said second predetermined termination point is located on said lateral section of said upper arm cuff,
wherein said third predetermined termination point is located on said posterior section of said upper arm cuff, and
wherein said fourth predetermined termination point is located on said medial section of said upper arm cuff;
donning said upper body apparatus on said user;
moving said first flexible tendon and said third flexible tendon in combination to move a shoulder of said user of the upper body apparatus in a shoulder flexion movement and a shoulder extension movement; and
moving said second flexible tendon and said fourth flexible tendon in combination to move the shoulder of the user of the upper body apparatus in a shoulder abduction movement and a shoulder adduction movement.

6. The method of claim 5,
wherein the lower arm cuff is in operational relationship with said one or more flexible tendons,
wherein said one or more flexible tendons further includes a first lower cuff flexible tendon, wherein said first lower cuff flexible tendon is routed from said one or more motors to said upper arm cuff at a predetermined location, and wherein said first lower cuff flexible tendon is connected to said lower arm cuff at a first lower cuff termination point; and the method further comprising, moving said first lower cuff flexible tendon to impart an elbow flexion motion to the user of the upper body apparatus when the first lower cuff flexible tendon is pulled by said one or more motors.

7. The method of claim 6, wherein said upper-body apparatus further comprises an elbow extension bar attached to the lower arm cuff, wherein said one or more flexible tendons is further comprised of a second lower cuff flexible tendon, and wherein said second lower cuff flexible tendon is operationally connected to said one or more motors, wherein said second lower cuff flexible tendon is connected to said elbow extension bar; and the method further comprising, moving said second lower cuff flexible tendon to impart an elbow extension motion to the user of the upper body apparatus when the second lower cuff flexible tendon is pulled by said one or more motors.

8. The method of claim 5, wherein said first elevated shoulder section includes a shoulder rest configured to conform to a shoulder of a user and an extension portion interconnected to the shoulder rest, and wherein the yoke interconnects the shoulder rest to the extension portion to elevate said extension portion from said shoulder rest and said shoulder of said user.

9. The method of claim 8, wherein said yoke is configured to be elevated above said shoulder rest and shoulder of the user to distribute an applied force from said first flexible tendon, said second flexible tendon, and said third flexible tendon away from the shoulder of the user.

10. The method of claim 9, wherein moving said first flexible tendon, said second flexible tendon, said third flexible tendon and said fourth flexible tendon includes pulling said first flexible tendon, said second flexible tendon, said third flexible tendon and said fourth flexible tendon to actively control movement about the shoulder of the user.

11. The method of claim 10, wherein said pulling said first flexible tendon, said second flexible tendon, and said third flexible tendon applies a load on said first elevated shoulder section, wherein said extension portion has a cantilevered design configured to position said first flexible tendon, said second flexible tendon, and said third flexible tendon a predetermined distance away from an arm of the user, and wherein said extension portion interconnected to the yoke is configured to distribute said load away from the shoulder of said user and to a torso area of said user.

12. The method of claim 5, wherein said first elevated shoulder section includes a first conduit where said first conduit extends from said one or more motors to said first elevated shoulder section, wherein said first flexible tendon extends from a proximal end operationally connected to one of said one or more motors and through said first conduit from said one or more motors to said first elevated shoulder section and said first flexible tendon extends out of the conduit and attaches at a distal end to the first predetermined termination point, and wherein said first flexible tendon actuates said shoulder movement by pulling said first tendon though said first conduit.

13. An upper-body apparatus comprising:

a shoulder saddle wherein said shoulder saddle is comprised of a yoke and one or more elevated shoulder sections, wherein said one or more elevated shoulder sections is comprised of a first elevated shoulder section;

a back torso section structurally connected to said yoke;

a front torso section structurally connected to said yoke;

one or more actuators each structurally connected to either said back torso section or front torso section wherein each of said one or more actuators are comprised of one or more motors;

one or more flexible tendons operationally connected to a predetermined one of said one or more actuators, wherein said one or more flexible tendons is comprised of a first flexible tendon, a second flexible tendon, a third flexible tendon, and a fourth flexible tendon;

an upper arm cuff in operational relationship with said one or more flexible tendons;

a lower arm cuff in operational relationship with said one or more flexible tendons;

wherein said first flexible tendon is routed from said one or more motors to said first elevated shoulder section at a first predetermined position on said first elevated shoulder section, wherein said first flexible tendon is connected to said upper arm cuff at a first predetermined termination point, wherein said second flexible tendon is operationally connected to said one or more motors and routed from said one or more motors to said first elevated shoulder section at a second predetermined position on said first elevated shoulder section, wherein said second flexible tendon is connected to said upper arm cuff at a second predetermined termination point, wherein said third flexible tendon is routed from said one or more motors to said first elevated shoulder section at a third predetermined position on said first elevated shoulder section, wherein said third flexible tendon is connected to said upper arm cuff at a third predetermined termination point, wherein said fourth flexible tendon is routed from said one or more motors and is connected to said upper arm cuff at a fourth predetermined termination point, wherein said first flexible tendon, said second flexible tendon, said third flexible tendon, and said fourth flexible tendon are configured to effectuate shoulder movement of the user, wherein said upper arm cuff includes an anterior section, a lateral section, a medial section, and a posterior section, wherein said first predetermined position is located on an anterior side of said first elevated shoulder section, said second predetermined position is located on a lateral side of said first elevated shoulder section, and said third predetermined position is located on a posterior side of said first elevated shoulder section, wherein said first predetermined termination point is located on said anterior section of said upper arm cuff, wherein said second predetermined termination point is located on said lateral section of said upper arm cuff, wherein said third predetermined termination point is located on said posterior section of said upper arm cuff, wherein said fourth predetermined termination point is located on said medial section of said upper arm cuff, wherein said first flexible tendon and said third flexible tendon in combination are configured to move a shoulder of said user of the upper body apparatus in a shoulder flexion movement and a shoulder extension movement, and wherein said second flexible tendon and said fourth flexible tendon in combination are configured to move the shoulder of the user of the upper body apparatus in a shoulder abduction movement and a shoulder adduction movement.

14. The apparatus of claim 13 comprising:

wherein the one or more flexible tendons further comprises a first lower cuff flexible tendon, wherein said first lower cuff flexible tendon is routed through or around said upper arm cuff at a first predetermined location, and wherein said first lower cuff flexible tendon is connected to said lower arm cuff at a first lower cuff termination point.

15. The apparatus of claim 14, further comprising:

an elbow extension bar attached to the lower arm cuff;

wherein said one or more flexible tendons is further comprised of a second lower cuff flexible tendon operationally connected to said one or more motors, wherein said second lower cuff flexible tendon is routed through or around said upper arm cuff at a second predetermined location, wherein said second lower cuff flexible tendon is connected to said elbow extension bar at a second lower cuff termination point, and wherein said second lower cuff flexible tendon is configured to impart an elbow extension motion to the user of the upper body apparatus when the second lower cuff flexible tendon is pulled by the one or more motors.

16. The apparatus of claim 15, wherein the elbow extension bar is configured to be slidably adjustable along a forearm of the user in an axial direction.

* * * * *